US011904334B2

(12) United States Patent
Fritz et al.

(10) Patent No.: US 11,904,334 B2
(45) Date of Patent: Feb. 20, 2024

(54) COATING METHOD AND CORRESPONDING COATING INSTALLATION

(71) Applicant: Dürr Systems AG, Bietigheim-Bissingen (DE)

(72) Inventors: Hans-Georg Fritz, Ostfildern (DE); Benjamin Wöhr, Eibensbach (DE); Jerome Lavallée, Albstadt (DE); Moritz Bubek, Ludwigsburg (DE); Timo Beyl, Besigheim (DE); Daniel Tandler, Stuttgart (DE); Tobias Berndt, Ditzingen (DE); Frank Herre, Oberriexingen (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 149 days.

(21) Appl. No.: 17/609,019

(22) PCT Filed: May 4, 2020

(86) PCT No.: PCT/EP2020/062240

§ 371 (c)(1),
(2) Date: Nov. 5, 2021

(87) PCT Pub. No.: WO2020/225174

PCT Pub. Date: Nov. 12, 2020

(65) Prior Publication Data

US 2022/0212218 A1 Jul. 7, 2022

(30) Foreign Application Priority Data

May 9, 2019 (DE) ..................... 10 2019 112 113.2

(51) Int. Cl.

*B05B 12/04* (2006.01)
*B05B 12/00* (2018.01)
*B05D 1/02* (2006.01)

(52) U.S. Cl.

CPC ............ *B05B 12/04* (2013.01); *B05B 12/004* (2013.01); *B05D 1/02* (2013.01)

(58) Field of Classification Search

CPC ........ B05B 12/04; B05B 12/004; B05D 11/02
See application file for complete search history.

(56) References Cited

U.S. PATENT DOCUMENTS 4,870,560 A 9/1989 Seki et al.
4,996,091 A 2/1991 McIntyre
(Continued)

FOREIGN PATENT DOCUMENTS

CN 104994966 A 10/2015
CN 106999974 A 8/2017
(Continued)

OTHER PUBLICATIONS

International Search Report and Written Opinion for PCT/EP2020/062240 dated Sep. 22, 2020 (13 pages; with English translation).
(Continued)

*Primary Examiner* — Nathan T Leong
(74) *Attorney, Agent, or Firm* — Bejin Bieneman PLC

(57) ABSTRACT

The disclosure relates to a coating method for coating a component (e.g. motor vehicle body component) with a coating agent (e.g. paint), that includes steps of Defining a pattern on the component surface of the component to be coated, the pattern being a surface area outlined by a contour, and areal coating of the component surface with the coating agent within the contour, (Continued)

sharp-edged coating of the component surface with a coating agent along at least a portion of the contour of the pattern.

19 Claims, 5 Drawing Sheets

(56) References Cited

U.S. PATENT DOCUMENTS

| | | | |
|---|---|---|---|
| 6,811,807 | B1 | 11/2004 | Zimmermann et al. |
| 9,592,524 | B2 | 3/2017 | Fritz et al. |
| 10,046,361 | B2 | 8/2018 | Wolf |
| 10,150,304 | B2 | 12/2018 | Herre et al. |
| 10,464,095 | B2 | 11/2019 | Fritz et al. |
| 10,507,483 | B2 | 12/2019 | Fritz et al. |
| 10,814,643 | B2 | 10/2020 | Herre et al. |
| 11,117,160 | B2 | 9/2021 | Fritz et al. |
| 2004/0221804 | A1 | 11/2004 | Zimmermann et al. |
| 2011/0262622 | A1 | 10/2011 | Herre et al. |
| 2013/0284833 | A1 | 10/2013 | Fritz et al. |
| 2015/0375258 | A1 | 12/2015 | Fritz et al. |
| 2016/0082461 | A1 | 3/2016 | Wolf |
| 2017/0136481 | A1* | 5/2017 | Fritz ......................... B05B 1/18 |
| 2017/0341098 | A1* | 11/2017 | Fritz .................. B05B 13/0421 |
| 2018/0250955 | A1 | 9/2018 | Herre et al. |
| 2019/0193421 | A1 | 6/2019 | Herre et al. |
| 2020/0094282 | A1 | 3/2020 | Fritz et al. |

FOREIGN PATENT DOCUMENTS

| | | | |
|---|---|---|---|
| DE | 19854760 | A1 | 5/2000 |
| DE | 199 36 790 | A1 | 2/2001 |
| DE | 10039442 | A1 | 2/2002 |
| DE | 101 50 826 | A1 | 4/2003 |
| DE | 102010019612 | A1 | 11/2011 |
| DE | 102013002412 | A1 | 8/2014 |
| DE | 10 2013 006 868 | A1 | 10/2014 |
| DE | 102014017707 | A1 | 6/2016 |
| DE | 102016014944 | A1 | 6/2018 |
| EP | 0282599 | A1 | 9/1988 |
| EP | 1184139 | A2 | 3/2002 |
| EP | 2770322 | A1 | 8/2014 |
| EP | 2900921 | A1 | 8/2015 |
| FR | 1314412 | A | 1/1963 |
| WO | 2010046064 | A1 | 4/2010 |
| WO | 2014121916 | A1 | 8/2014 |

OTHER PUBLICATIONS

Favre-Bulle, B.: “Automatisierung komplexer Industrieprozesse—Systeme, Verfahren und Infor-mationsmanagement”, Springer-Verlag GmbH, 2004, ISBN 978-3-7091-0562-7 (6 pages; with English machine translation).

German PTO Office Action for Application No. 102019112113.2 dated Feb. 19, 2020 (7 pages; with English machine translation).

Chinese Examination and Search Report dated Nov. 24, 2022 in related Application No. CN 202080034603.7 (22 pages; with English machine translation).

Chinese National Intellectual Property Administration Office Action with Search Report for Application No. CN202080034603.7 dated Jun. 22, 2023 (30 pages; with English translation).

* cited by examiner

COATING METHOD AND CORRESPONDING COATING INSTALLATION

CROSS-REFERENCE TO RELATED APPLICATIONS

This application is a national stage of, and claims priority to, Patent Cooperation Treaty Application No. PCT/EP2020/062240, filed on May 4, 2020, which application claims priority to German Application No. DE 10 2019 112 113.2, filed on May 9, 2019, which applications are hereby incorporated herein by reference in their entireties.

The disclosure relates to a coating method for coating a component (e.g. motor vehicle body component) with a coating agent (e.g. paint). Furthermore, the disclosure relates to a corresponding coating plant.

BACKGROUND

In modern coating plants for painting motor vehicle body components, rotary atomizers are usually used as application devices, which deliver a spatially extended spray jet of the paint to be applied.

A more recent line of development provides nozzle applicators as application devices, which are also referred to as printheads and are described, for example, in DE 10 2013 002 412 A1. In contrast to the known rotary atomizers, such nozzle applicators do not emit a spatially extended spray jet of the coating, but a spatially narrowly limited coating agent jet. This has the advantage that the applied coating is deposited almost completely on the component to be coated, so that there is little or no overspray. Another advantage of these known nozzle applicators is that patterns can also be applied to the component surface, such as graphics or lettering. However, the problem here is that the contours of the patterns are not sharp-edged.

When a droplet jet is applied, the coating agent droplets initially form circular coatings on the component surface, which then merge into a contiguous coating film due to the cohesive force of the applied coating. However, a droplet structure is still visible on the outer contour of the pattern.

The same problem occurs in a similar form if, instead of a droplet jet, a coating agent jet is applied that is contiguous in the jet direction. In this case, the coating agent jets form contiguous coating agent paths on the component surface, which usually lie next to each other and then converge due to the cohesive force of the applied coating. However, a structure can also be seen at the ends of the paths, so that the contour is not sharp-edged on all sides of the surface or pattern.

For the technical background of the disclosure, reference should also be made to DE 198 54 760 A1, DE 10 2010 019 612 A1, DE 10 2013 006 868 A1, EP 0 282 599 A1, DE 199 36 790 A1, EP 2 770 322 A1, FAVRE-BULLE, B.: "Automatisierung komplexer Industrieprozesse—Systeme, Verfahren and Infor-mationsmanagement", Springer-Verlag GmbH, 2004, ISBN 978-3-7091-0562-7, DE 10 2016 014 944 A1 and DE 101 50 826 A1.

DETAILED DESCRIPTION

Figure 1A:
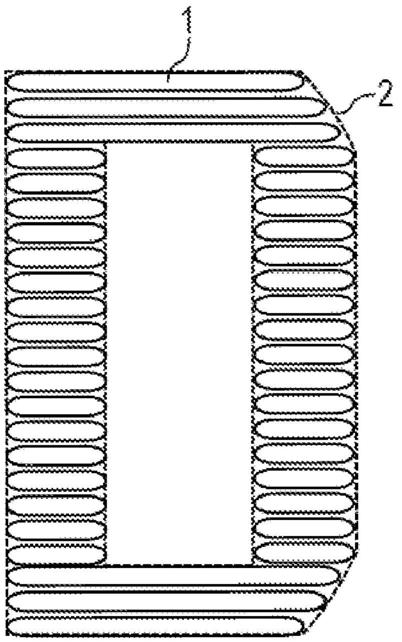
Fig. 1A Prior art
FIG. 1A is a schematic representation of the conventional application of a pattern with a nozzle applicator that emits a coating agent jet that is contiguous in the longitudinal direction of the jet, FIG. 1B the pattern according to FIG. 1A after the coating agent paths have converged on the component surface, FIG. 2A a modification of FIG. 1A for a nozzle applicator which emits a droplet jet, FIG. 2B a modification of FIG. 1B for the nozzle applicator emitting a droplet jet, FIGS. 3A-3D various schematic representations of the application of a pattern according to the disclosure with a nozzle applicator that emits a coating agent jet that is contiguous in the longitudinal direction of the jet, FIGS. 4A-4D variations of FIGS. 3A-3D for a nozzle applicator emitting a droplet jet, FIG. 5 a flow chart illustrating the coating method according to the disclosure, and FIG. 6 a highly simplified schematic representation of a coating installation according to the disclosure.

The coating method according to the disclosure firstly provides that a pattern is defined which is to be produced on the component surface of the component to be coated, the pattern being a surface region which is outlined by a contour. The concept of a pattern used in the context of the disclosure is to be understood in a general sense and includes, for example, graphics, lettering, pictures, letters, numerals and other possible designs as well as partial surfaces of a coating object (e.g. roof spar, fender, etc. of a motor vehicle body).

The pattern is divided into contour parts and areal parts by an operator in a suitable manner and by means of aids such as software, either semi-automatically or fully automatically. In a further step, path programs are created manually, semi-automatically or fully automatically from the information (partial surfaces) determined in this way.

Furthermore, the coating method according to the disclosure provides, in accordance with the known coating methods, that the component surface is areally coated within the predetermined contour of the desired pattern, preferably using a nozzle applicator (e.g. printhead) as already mentioned above with regard to the state of the art.

The coating method according to the disclosure is characterized by sharp-edged coating of the component surface with a coating agent along at least part of the contour of the pattern. In the context of the disclosure, therefore, the pattern is filled in areally within the contour, while the contour or parts of the contour (e.g. front end edge) of the pattern are traced with sharp edges.

It should be mentioned here that various sequences of these two coating steps are possible within the scope of the disclosure. One variant of the disclosure envisages that the areal coating of the component surface within the contour is carried out first, followed by the sharp-edged coating along the contour of the pattern. However, it is alternatively also possible that the contour of the pattern is drawn first, followed by the areal coating within the contour.

Furthermore, it should be mentioned that the areal coating within the contour of the predetermined pattern is preferably carried out with a greater area coating performance than the sharp-edged coating along the contour. The term area coating performance used in the context of the disclosure defines the size of the area coated on the component within a certain unit of time, i.e. the ratio of coated area and required coating time.

In the case of a nozzle applicator as an application device, this variation of the area coating performance can be achieved, for example, by activating or deactivating several nozzles of the nozzle applicator. Thus, the areal coating within the contour can be done with a large number of activated nozzles, whereas edge coating along the contour of the pattern can be done with a smaller number of activated nozzles. For example, sharp-edged coating along the contour of the pattern can be done with fewer than 20, 10, 5, or even just a single nozzle of the nozzle applicator.

However, the variation of the area coating performance for the areal coating on the one hand and for the sharp-edged coating on the other hand can also be carried out in other ways. For example, the flow rate of the applied coating agent can be changed, for which purpose the application pressure can be varied.

Furthermore, the applicator (e.g. nozzle applicator) is preferably moved over the component surface by a manipulator in the coating method according to the disclosure. The manipulator is preferably a multi-axis coating robot with serial robot kinematics. Another possibility of a manipulator is an x-y or x-y-z linear axis system, in which the applicator is attached to one of the axes and the axes are attached and related to each other in such a way that the applicator can be moved to any location on the surface to be coated.

In the aforementioned sharp-edged coating along the contour of the pattern, the manipulator moves the applicator along the contour of the pattern at a certain traversing speed, with the applicator applying a certain flow rate of the coating agent. However, depending on the shape of the pattern and the shape of the contour, it is usually not possible for the applicator to move over the component surface at a constant traversing speed. For example, the applicator must be slowed down and accelerated again at corner points, generally at points of the contour with discontinuous directional progression, turning points or kinks. With a constant flow rate of the applied coating agent, this would lead to a corresponding variation in the coating thickness on the component surface due to the variation in the traversing speed. These undesirable variations in the coating thickness on the component surface can be prevented by adjusting the flow rate of the coating agent as a function of the traversing speed. Thus, a reduction in the traversing speed then leads to a corresponding reduction in the mass flow of the coating agent, while an increase in the traversing speed also requires a corresponding increase in the mass flow of the coating agent.

However, the above-described adjustment of the flow rate of the coating agent as a function of the traversing speed is not sufficient in all cases to achieve a constant coating thickness on the component surface, or is not always technically feasible. For example, it is difficult for a coating robot with serial robot kinematics to realize right-angled kinks in the robot path. It can therefore also be advantageous not to traverse the contour continuously, but in several path sections that can be traversed easily by the manipulator because they have no corners, kinks or turning points. Between the successive path sections, the applicator then interrupts the delivery of the coating agent and starts the next path section during this coating pause.

This subdivision of the contour of the pattern to be traversed into several successive path sections is particularly useful at problem points, such as kinks in the contour. The term "problem area" used in the context of the disclosure preferably refers to the fact that the manipulator used can pass the respective problem area without interruption only with a sharp drop in the traversing speed, for example with a drop in the traversing speed of more than 50%, 70%, 80% or 90%.

Depending on the manipulator type, the stiffness of the manipulator and/or the overall system consisting of manipulator, traversing axis, substrate and/or the capabilities of the applicator, the possible radii and/or the acceleration distances can be different.

If the motion path program of the manipulator is to be created automatically, the above-mentioned parameters are entered or stored in the software required for this purpose.

Furthermore, it is to be mentioned that the manipulator preferably executes a kink-free start movement at the problem points between the coating of the immediately successive path sections in order to contact the immediately following path section again.

In one variant of the disclosure, the sharp-edged coating of the contour is carried out with a coating agent jet which is contiguous in the longitudinal direction of the jet, preferably along the entire contour.

In another variant of the disclosure, however, the sharp-edged coating of the contour is first carried out with a coating agent jet that is contiguous in the longitudinal direction of the jet and then with a droplet jet consisting of numerous droplets that are not contiguous in the longitudinal direction of the jet.

Within the scope of the disclosure, the areal coating of the pattern and/or the sharp-edged coating of the contour can be carried out alternately with a coating agent jet that is contiguous in the longitudinal direction of the jet and with a droplet jet that consists of numerous droplets that are not contiguous in the longitudinal direction of the jet. This alternation between the different jet forms (droplet jet or contiguous jet) can be temporal or alternating between the pattern within the contour and the contour itself.

It has already been briefly mentioned above that within the scope of the disclosure there is the possibility that first the pattern within the contour is applied over the surface and only then the contour is traced. Within the scope of the disclosure, it is possible that after the pattern has been applied to the surface, a measuring system (e.g. optical measuring system) is first used to determine the spatial orientation and position of the contour, which is initially still blurred, so that the contour can then be traced with an accurate fit.

Alternatively, however, the contour can be pre-drawn first and then the pattern within the contour is coated over the entire surface. In this case, it is possible that after the contour has been pre-drawn, the spatial position and orientation of the contour is first determined by means of a measuring system so that the pattern can then be coated areally within the pre-drawn contour with an accurate fit.

The aforementioned measuring system can be attached to the manipulator and is then moved with the manipulator. Alternatively, however, it is also possible for the measuring system to be arranged separately from the manipulator in a fixed position.

Preferably, the measuring system operates optically and has at least one camera and one image evaluation unit for this purpose.

In one variant of the disclosure, the areal coating within the contour is carried out with the same coating agent as the sharp-edged coating along the contour.

In another variant of the disclosure, however, different coating agents are used for this purpose, in particular coating agents with different colors.

Furthermore, within the scope of the disclosure, it is possible for the areal coating to be carried out with different coating agents for different patterns. Furthermore, it is also possible for the sharp-edged coating to be carried out with different coating agents for different contours.

It has already been briefly mentioned above that the coating agent droplets or coating agent paths applied to the component converge into a contiguous coating agent film after application due to the cohesive force of the coating agent, which is desirable in principle. However, this convergence is only possible within a certain flow time after application of the coating agent. If the same coating agent is used for the contour and for the areal coating, it is basically desirable for the contour and the inner surface to run together. In this case, the areal coating of the pattern and the sharp-edged coating along the contour are preferably carried out at a time interval that is shorter than the flow time, so that the coating agent for the contour and the surface can run together.

In the case of different coating agents for the contour and inner surface, and in particular in the case of differently colored coating agents for the contour and inner surface, however, this convergence of the coating agents is precisely undesirable. In this case, the areal coating of the pattern and the sharp-edged coating along the contour are preferably carried out at a time interval that is greater than the flow time, so that the different coating agents for the contour and the inner surface do not run together.

In general, it should be mentioned that the coating agent is preferably applied by an applicator which does not emit a spray jet, but a narrowly limited coating agent jet. The applicator can therefore be a printhead, as is known in principle from the prior art.

The coating agent jet can, for example, consist of coating agent droplets which are separated from one another in the longitudinal direction of the jet. Alternatively, however, it is also possible for the coating agent jet to be contiguous in the longitudinal direction of the jet.

It has already been briefly mentioned above that the applicator is preferably moved over the component surface by a manipulator, preferably a multi-axis coating robot with serial robot kinematics or a linear axis system.

It is advantageous here if the manipulator has a high spatial positioning accuracy and/or repeatability, which is preferably more precise than 5 mm, 2 mm or even 0.5 mm. This is useful so that the contour and the inner surface of a pattern can be applied to fit each other precisely.

With regard to the type of coating agent applied, the disclosure is not limited to paints, such as one-component paints, two-component paints, water-based paints or solvent-based paints. Rather, the coating agent may also be an adhesive, a bonding agent, a primer, a pasty material, a sealant, or an insulating material.

Furthermore, it should be mentioned that the coating agent is preferably applied with a certain application distance between the applicator and the component surface, the application distance preferably being in the range of 1 mm-80 mm, 5 mm-50 mm or 10 mm-50 mm.

Furthermore, it should be mentioned that the disclosure does not only claim protection for the coating method according to the disclosure described above. Rather, the disclosure also claims protection for a corresponding coating installation that carries out the coating method according to the disclosure.

Thus, the coating apparatus according to the disclosure firstly comprises an applicator for applying the coating agent, preferably being a nozzle applicator or a printhead.

Furthermore, the coating installation according to the disclosure comprises a manipulator for moving the applicator over the component surface, preferably a multi-axis coating robot with serial robot kinematics or a linear axis unit.

In addition, the coating installation according to the disclosure comprises a control system for controlling the manipulator and the applicator, wherein the control system can comprise hardware components and software components and can be distributed to different parts and components. The control system is designed in such a way that the coating installation executes the above-described coating method according to the disclosure.

For this purpose, the coating installation according to the disclosure can also comprise the measuring system already mentioned above.

Finally, the disclosure also claims protection for a corresponding control program which, when executed on the control system, causes the application system to carry out the coating method according to the disclosure. The control program may be stored on a computer-readable medium (e.g., computer memory, USB stick, CDROM, DVD, memory card, etc.) so that the computer-readable medium with the control program stored thereon is also protected.

Figure 1B:
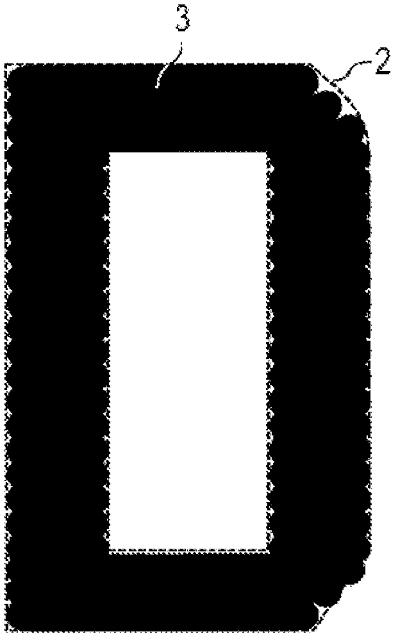
Fig. 1B Prior art

FIGS. 1A and 1B show schematic representations of a conventional application of a pattern in the form of the letter D to a component surface of a component, such as a motor vehicle body component. In this case, a nozzle applicator applies a coating agent jet which is contiguous in the longitudinal direction of the jet to the component surface, so that initially elongated coating agent paths 1, which are bounded by a contour 2, are formed on the component surface. After impact on the component surface, the coating agent paths 1 then converge due to the cohesive force of the applied coating and then form a contiguous pattern 3. In this known type of pattern application, however, the outlines of the coating agent paths 1 are still recognizable along the contour 2. The contour 2 is therefore not particularly sharp-edged, which is undesirable.

Figure 2A:
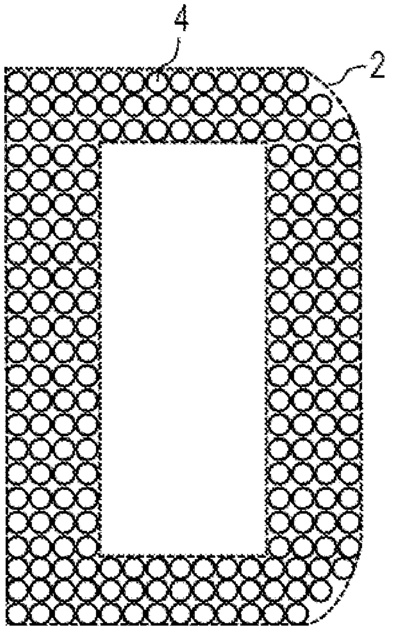
Fig. 2A Prior art
Figure 2B:
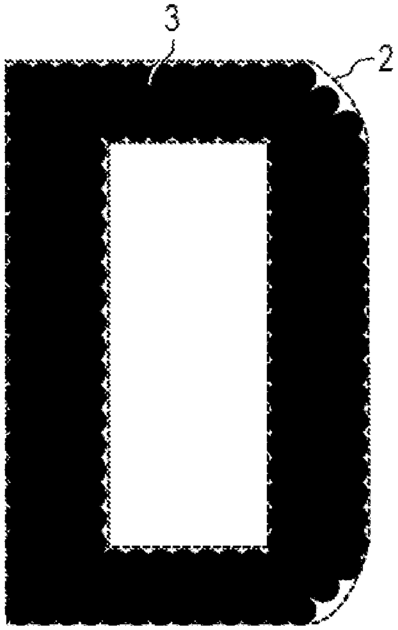
Fig. 2B Prior art
Figure 3A:
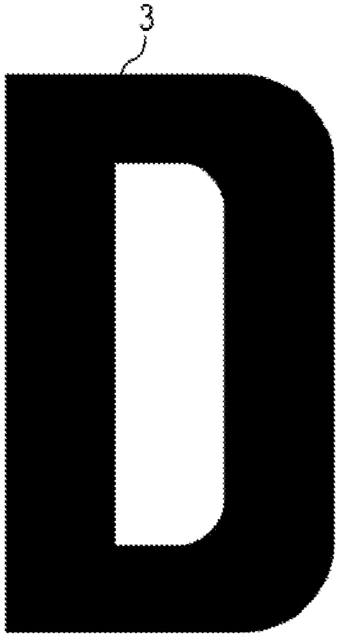
Figure 3B:
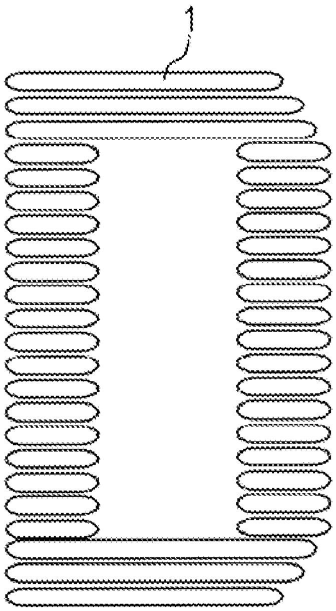
Figure 3C:
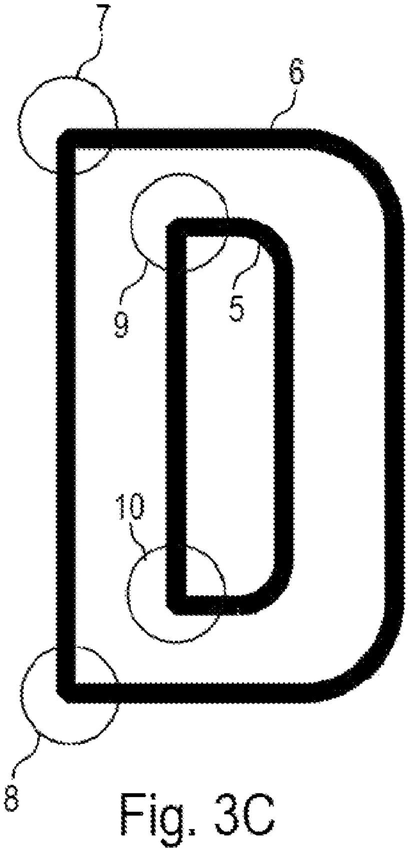
Figure 3D:
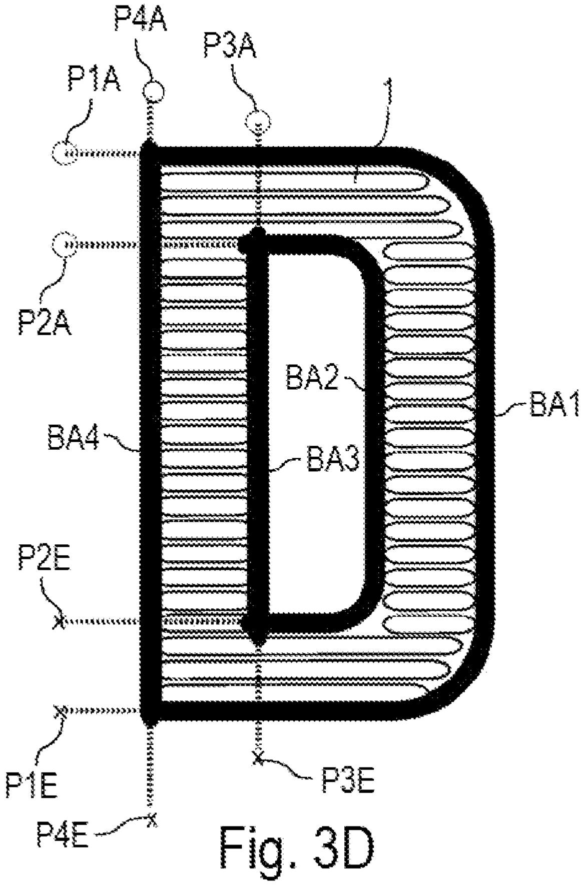
Figure 4A:
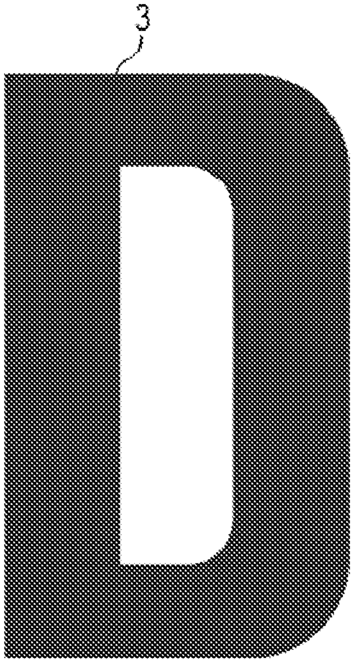
Figure 4B:
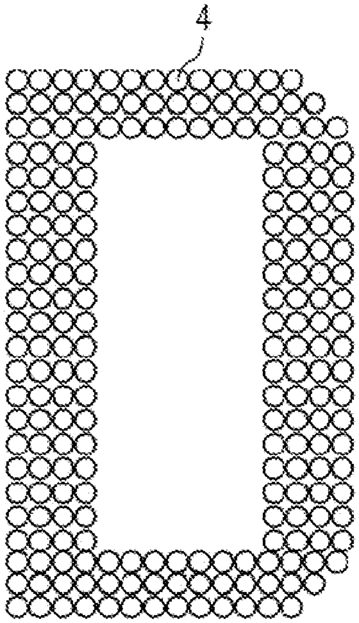
Figure 4C:
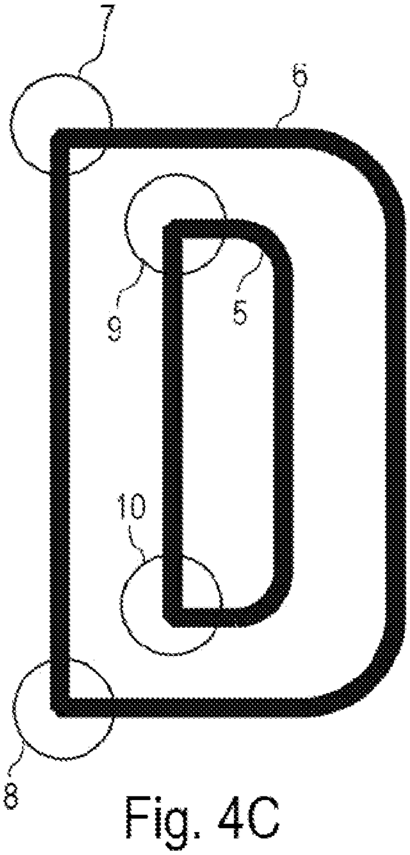
Figure 4D:
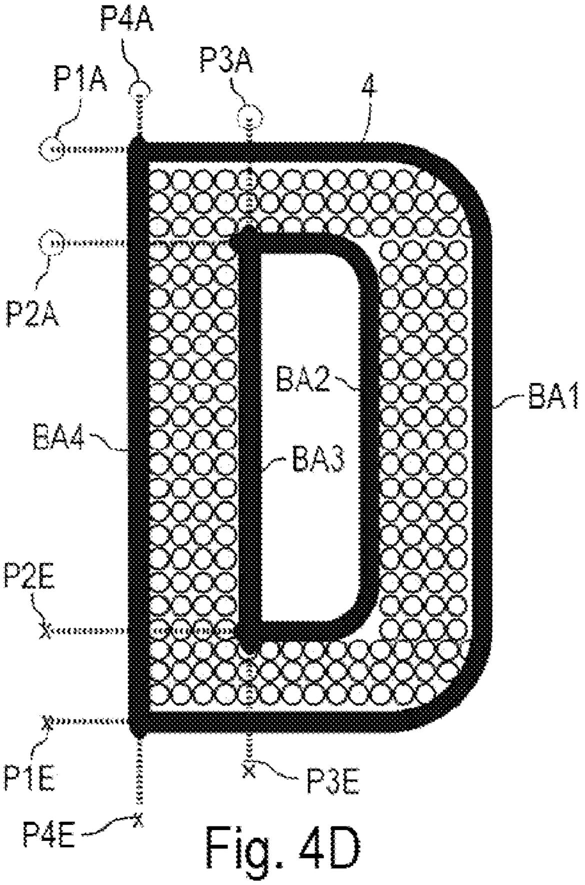

FIGS. 2A and 2B show corresponding illustrations for the pattern application with a nozzle applicator that emits a droplet jet, i.e. a coating agent jet consisting of coating agent droplets that are not contiguous in the longitudinal direction of the jet.

Instead of the coating agent paths 1, coating agent droplets 4 are formed on the component surface, which then also run together to form the contiguous pattern 3 due to the cohesive force of the applied coating agent. Here too, however, the contour 2 of the pattern 3 is not particularly sharp-edged.

FIGS. 3A-3D show illustrations of pattern application according to the disclosure, these illustrations corresponding in principle to FIGS. 1A and 1B, i.e. here, too, the pattern 3 is applied by a nozzle applicator which emits coating agent jets contiguous in the longitudinal direction of the jet, so that the coating agent paths 1 are formed on the component surface. It should be mentioned here that the reference sign 3 in FIG. 3A designates the desired pattern, i.e. the specification that is used in the entire process.

Here, the pattern 3 has an inner contour 5 and an outer contour 6, which are sharp-edged painted to produce the desired edge sharpness of the pattern 3. For this purpose, the nozzle applicator is guided along the inner contour 5 and along the outer contour 6 and then coats the inner contour 5 or the outer contour with edge sharpness, whereby only a single nozzle or only a few nozzles of the nozzle applicator are used to achieve the desired edge sharpness.

The areal coating of the pattern 3 within the contour 2 is then carried out in a separate processing step, for example with a higher area coating performance.

The nozzle applicator is guided over the component surface by a multi-axis coating robot with serial robot kinematics. Although such a coating robot enables high-precision positioning of the nozzle applicator, kinks with an angle (greater than a limit angle), in particular right-angled ones, of the robot path are problematic. Thus, the outer contour 6 has two problem areas 7, 8, where the outer contour 6 shows a rectangular kink. Correspondingly, the inner contour 5 also has problem areas 9, 10 where the inner contour 5 shows a rectangular kink. It is therefore difficult for a coating robot with serial robot kinematics to guide the nozzle applicator exactly over the problem areas 7-10, since the traversing speed would have to be greatly reduced (limit value zero) for this.

The coating method according to the disclosure provides for the outer contour 6 to be divided into two path sections BA1, BA4, just as the inner contour 5 is divided into two path sections BA2, BA3. During the sharp-edged coating of the outer contour 6, the path section BA1 is coated first, starting from an starting point P1A and ending at a departure point P1E. No large angles (sharp kinks) occur on the path section BA1, so that the coating robot can guide the nozzle applicator along the path section BA1 at an almost constant traversing speed.

The path section BA2 of the inner contour 5 is coated accordingly, starting from an starting point B2A and ending with a departure point P2E. Here, too, there are no kinks on the path section BA2, which allows an almost constant traversing speed within the path section BA2.

The path section BA3 starts at the starting point P3A and ends at the departure point P3E and is completely linear, which also allows a constant traversing speed on the path section BA3.

Finally, the path section BA4 starts at the starting point P4A and ends at the departure point P4E. The path section BA4 is also completely linear and therefore enables a constant traversing speed.

FIGS. 4A-4D show modifications of FIGS. 3A-3D for a nozzle applicator that emits a droplet jet. To avoid repetition, reference is therefore made to the description of FIGS. 3A-3D.

Figure 5:
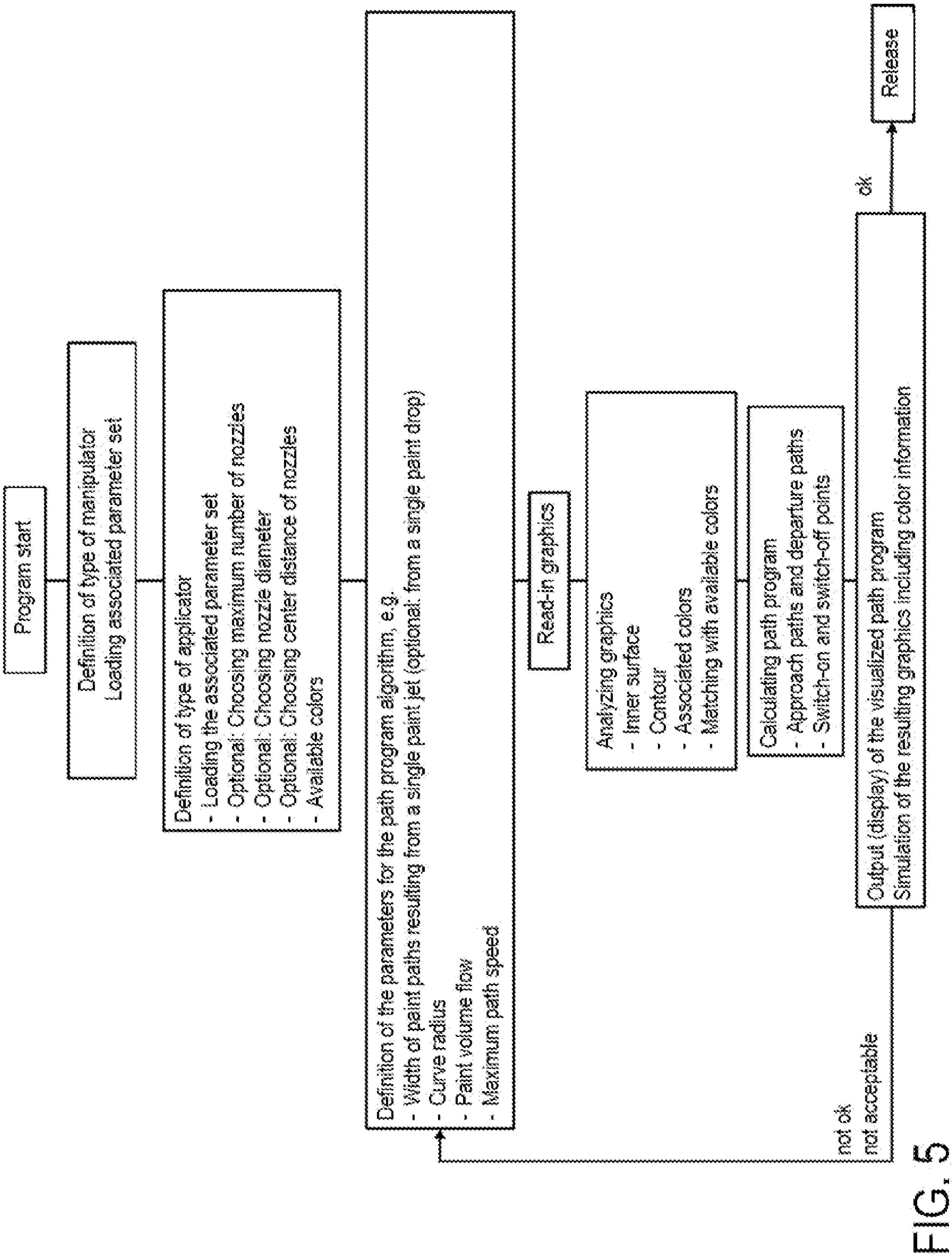

FIG. 5 shows a flow chart to illustrate the coating method according to the disclosure.

After the program start, the manipulator type is first defined in a step S1, i.e. the type of the multi-axis coating robot used or, for example, the type of the linear axis system. Depending on the manipulator type, an associated parameter set is then loaded, which reflects the properties of the respective manipulator.

In a step S2, the applicator type is then determined and a corresponding parameter set is loaded that reflects the properties of the respective applicator type, as well as optional parameters, such as the spacing of the nozzles, the nozzle diameter and the number of nozzles.

In a step S3, parameters for a path program algorithm are then defined, such as maximum and/or minimum coating path width, minimum possible curve radius, minimum and/or maximum coating volume flow and maximum path speed.

In a step S4, a graphic is then read in, which is to be applied as a pattern.

In a step S5, the graphic is then analyzed, for example with regard to the inner surface, the contour, the assigned colors and with regard to matching with the available colors.

In a step S6, a path program is then calculated that defines starting and departure paths as well as switch-on and switch-off points.

In a step S7, the path program is then visualized and a simulation of the path program is performed. The operator of the program can then evaluate the result. If the path program is not acceptable, a corresponding adjustment follows in step S3. Otherwise, the path program is released for control.

Figure 6:
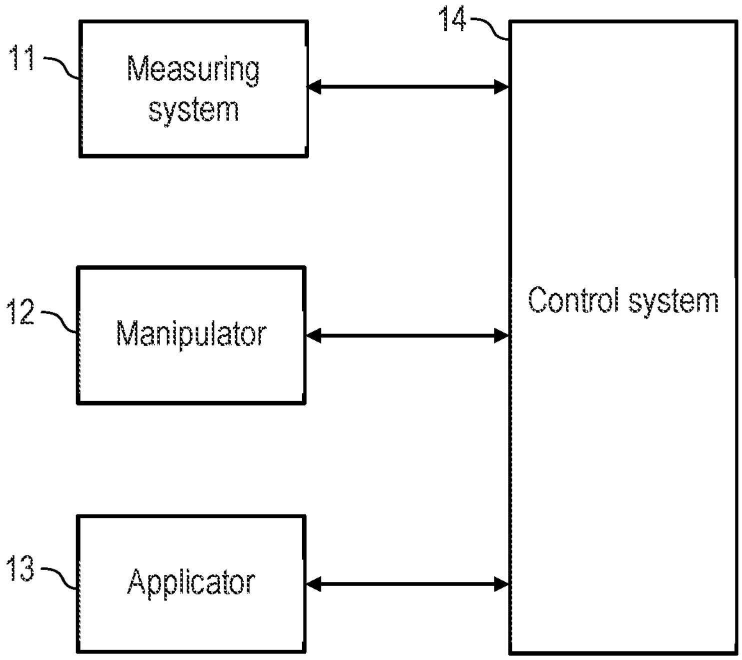

FIG. 6 shows a highly simplified schematic representation of a coating installation according to the disclosure with a measuring system 11, a manipulator 12, an applicator 13 and a control system 14. The control system 14 can have hardware components and software components and can be distributed over various parts and components.

The control system 14 controls the manipulator 12 and the applicator 13 in the manner described above so that the monitoring method according to the disclosure is carried out.

Here, the measuring system 11 can determine the spatial position and orientation of the contour and the inner surface of the pattern, so that the contour and the inner surface can be applied with an accurate fit to each other.

The disclosure is not limited to the preferred embodiments described above. Rather, a large number of variants and variations are possible which also make use of the inventive idea and therefore fall within the scope of protection.

The invention claimed is:

1. A coating method for coating a component with a coating agent, having the following steps:

a) defining a pattern on the component surface of the component to be coated, the pattern being a surface region which is bordered by a contour,
b) areal coating the component surface with the coating agent within the contour,
c) sharp-edged coating of the component surface with a coating agent along at least part of the contour of the pattern, and further comprising at least one of the following steps:

d) determining the type of a manipulator for guiding an applicator,
e) reading out a manipulator-specific parameter set from a memory, the manipulator-specific parameter set representing properties of the manipulator,
f) defining a type of applicator,
g) reading an applicator-specific parameter set from a memory, the applicator-specific parameter set representing properties of the applicator,
h) defining a path program-specific parameter set, the path program-specific parameter set defining properties of a robot path, including at least one of the following:
    h1) coating path width,
    h2) curve radius of the robot path,
    h3) coating volume flow,
    h4) maximum path speed,
i) reading of the pattern from a memory,
j) analysis of the read out pattern to determine the contour,
k) calculation of a path program including at least one of the following:
    k1) approach paths,
    k2) departure paths,
    k3) switch-on points, and/or
    k4) switch-off points,
l) visualization of the path program.

2. The coating method according to claim 1, wherein the areal coating within the contour is carried out with a greater area coating performance than the sharp-edged coating along the contour.

3. The coating method according to claim 1, wherein a) the coating is carried out by means of an applicator which has a plurality of nozzles which can be activated or deactivated individually or in groups for coating, b) for the areal coating within the contour, a larger number of nozzles are activated for the coating than in the case of sharp-edged coating along the contour, c) for the sharp-edged coating along the contour, fewer than 20 nozzles of the applicator is activated for the coating.

4. The coating method according to claim 1, wherein a) the sharp-edged coating along the contour of the pattern is carried out by means of an applicator which is moved along the contour by a manipulator, and b) the applicator applies the coating agent during the sharp-edged coating along the contour with a certain flow rate, and c) the manipulator moves the applicator along the contour at a specific speed over the component surface during the sharp-edged coating, and d) during the sharp-edged coating along the contour d1) the flow rate of the coating agent is adjusted as a function of the traversing speed in order to achieve a coating thickness on the component surface which is as constant as possible, or d2) the flow rate of the coating agent remains constant.

5. The coating method according to claim 1, wherein a) the sharp-edged coating along the contour of the pattern is carried out by means of an applicator which is moved along the contour by a manipulator, and b) the manipulator moves the applicator along the contour at a specific traversing speed over the component surface during the sharp-edged coating and in so doing traverses the contour, and c) the manipulator does not traverse the contour contiguously, but in several path sections, and d) the applicator interrupts the delivery of the coating agent between the coating of the immediately successive path sections of the contour.

6. The coating method according to claim 5, wherein a) the directly successive path sections adjoin one another at problem points of the contour, the problem points being characterized in that the manipulator could pass the problem points without an interruption only with a sharp drop in the traversing speed, and/or b) the manipulator executes a kink-free start movement at the problem points between the coating of the immediately successive path sections in order to start again at the immediately successive path section.

7. The coating method according to claim 1, wherein the sharp-edged coating of the contour is carried out with a coating agent jet which is contiguous in the longitudinal direction of the jet.

8. The coating method according to claim 1, wherein the sharp-edged coating of the contour is first carried out with a coating agent jet which is contiguous in the longitudinal direction of the jet and then with a droplet jet which consists of numerous droplets which are not contiguous in the longitudinal direction of the jet.

9. The coating method according to claim 1, wherein first the pattern and then the contour is coated.

10. The coating method according to claim 1, wherein first the contour and then the pattern is coated.

11. The coating method according to claim 1, further comprising the following steps:

a) first the pattern and only then the contour is coated, and b) the pattern applied to the component surface is detected with respect to its spatial position and extent by means of a measuring system, in order to determine the contour after the areal coating of the pattern.

12. The coating method according to claim 11, wherein a) the measuring system is attached to the manipulator and is moved with the manipulator, or b) the measuring system is arranged separately from the manipulator in a stationary manner.

13. The coating method according to claim 1, further comprising the following steps:

a) first the contour and then the pattern is coated, and b) the contour applied to the component surface is detected by means of a measuring system, in order to determine the areal extent of the pattern.

14. The coating method according to claim 1, wherein the areal coating within the contour is carried out with a different coating agent than the sharp-edged coating along the contour.

15. The coating method according to claim 1, wherein a) the coating agent, after application to the component surface, can only run within a certain running time in order to form a two-dimensional contiguous coating on the component surface, and b) the areal coating of the pattern and the sharp-edged coating along the adjacent contour are affected at a time interval which is shorter than the certain running time so that the coating agent of the contour and of the surface can run together.

16. The coating method according to claim 1, wherein a) the areal coating within the contour is carried out with a different coating agent than the sharp-edged coating along the contour, and b) the coating agent, after application to the component surface, can only run within a certain flow time in order to form a contiguous coating over the entire area of the component surface, and c) the areal coating of the pattern and the sharp-edged coating along the adjacent contour are carried out at a time interval which is greater than the certain flow time, so that the different coating agents of the contour and of the surface do not run together.

17. The coating method according to claim 1, wherein a) the coating agent is applied by an applicator which does not emit a spray jet but a narrowly limited coating agent jet, and b) the applicator is moved over the component surface by a manipulator, and c) the manipulator has a spatial positioning accuracy and/or repeatability accuracy which is more precise than 5 mm, and d) the coating agent is a paint, and e) the coating agent is applied with a certain application distance between the applicator and the component surface, wherein the application distance is 1 mm-80 mm.

18. A coating method for coating a component with a coating agent, having the following steps:

a) defining a pattern on the component surface of the component to be coated, the pattern being a surface region which is bordered by a contour, b) areal coating the component surface with the coating agent within the contour, c) sharp-edged coating of the component surface with a coating agent along at least part of the contour of the pattern, d) wherein the coating agent, after application to the component surface, can only run within a certain running time in order to form a two-dimensional contiguous coating on the component surface, and e) wherein the areal coating of the pattern and the sharp-edged coating along the adjacent contour are affected at a time interval which is shorter than the certain running time so that the coating agent of the contour and of the surface can run together.

19. A coating method for coating a component with a coating agent, having the following steps:

a) defining a pattern on the component surface of the component to be coated, the pattern being a surface region which is bordered by a contour, b) areal coating the component surface with the coating agent within the contour, c) sharp-edged coating of the component surface with a coating agent along at least part of the contour of the pattern, d) wherein the areal coating within the contour is carried out with a different coating agent than the sharp-edged coating along the contour, e) wherein the coating agent, after application to the component surface, can only run within a certain flow time in order to form a contiguous coating over the entire area of the component surface, and f) wherein the areal coating of the pattern and the sharp-edged coating along the adjacent contour are carried out at a time interval which is greater than the certain flow time, so that the different coating agents of the contour and of the surface do not run together.

* * * * *